United States Patent [19]

Milton

[11] 4,160,579
[45] Jul. 10, 1979

[54] TAPERED VELOCITY ELECTRO-OPTICAL WAVEGUIDE SWITCH

[75] Inventor: A. Fenner Milton, Washington, D.C.

[73] Assignee: The United States of America as represented by the Secretary of the Navy, Washington, D.C.

[21] Appl. No.: 896,075

[22] Filed: May 3, 1978

[51] Int. Cl.² .................................................. G02B 5/14
[52] U.S. Cl. ............................................................ 350/96.14
[58] Field of Search ........................... 350/96.12, 96.14

[56] References Cited

U.S. PATENT DOCUMENTS

| | | | |
|---|---|---|---|
| 3,909,108 | 9/1975 | Taylor | 350/96.14 |
| 3,995,311 | 11/1976 | Taylor | 350/96.14 |
| 4,070,092 | 1/1978 | Burns | 350/96.14 |

Primary Examiner—Stewart J. Levy
Attorney, Agent, or Firm—R. S. Sciascia; Philip Schneider; Melvin L. Crane

[57] ABSTRACT

A four-part electro-optical switch for switching optical radiation from one waveguide to another. Parallel waveguides are embedded in the surface of a substrate and provided with separating ends for transmitting radiation through the waveguides. Curved electrodes on the outer side of each waveguide in cooperation with a central electrode and separate voltage sources change the electro-optic properties of the waveguide such that radiation may be switched from one waveguide to the other when the voltage source is in the "on" state.

3 Claims, 3 Drawing Figures

TAPERED VELOCITY ELECTRO-OPTICAL WAVEGUIDE SWITCH

BACKGROUND OF THE INVENTION

This invention relates to optical waveguides and more particularly to a switch arrangement for switching radiation from one waveguide to another and for modulating optical signals.

Optical radiation has been switched in and out of optical waveguides by use of gratings, prisms, and acousto-optic devices. Optical radiation has been switched from one waveguide to another by use of parallel waveguides in which one or both waveguides included a section of electro-optical material whose index of refraction is changed by an electrical voltage. Electrodes placed parallel with spaced waveguides have also been used, as shown in U.S. Pat. Nos. 3,909,108 and 3,964,819. The device of U.S. Pat. No. 3,909,108 requires that electro-optic interaction occurs over a critical length which is voltage-independent but depends upon the coupling constant between the two waveguides. U.S. Pat. No. 3,964,819 requires a 3dB coupler at each end of each waveguide which adds to the length of the device. In prior art devices, the lengths of the waveguides in which radiation is transfered are critical in order to present the proper coupling length.

SUMMARY OF THE INVENTION

A four-part electro-optical switch between channel optical waveguides including electrodes which are placed relative to the waveguides. A voltage applied to the electrodes can be adjusted such that the coupling constant between the two waveguides and the rate of change of the difference in propagation constant, $\Delta\beta$, is held low enough to ensure adiabatic propagation within the center of the device to transfer power from one waveguide to the next. The device is bidirectional since radiation may be coupled in either direction and admitted in either waveguide at either end of the switching device. One of the main advantages of the device is that the device may be relatively short and the length is not critical since errors in the proportionality between the length, L, and the difference in propagation constant, $\Delta\beta$, can be compensated for by changing the voltage. The voltages may be applied to the electrodes with either polarity depending on the direction of the radiation and the waveguide to be switched.

DETAILED DESCRIPTION

Figure 1:
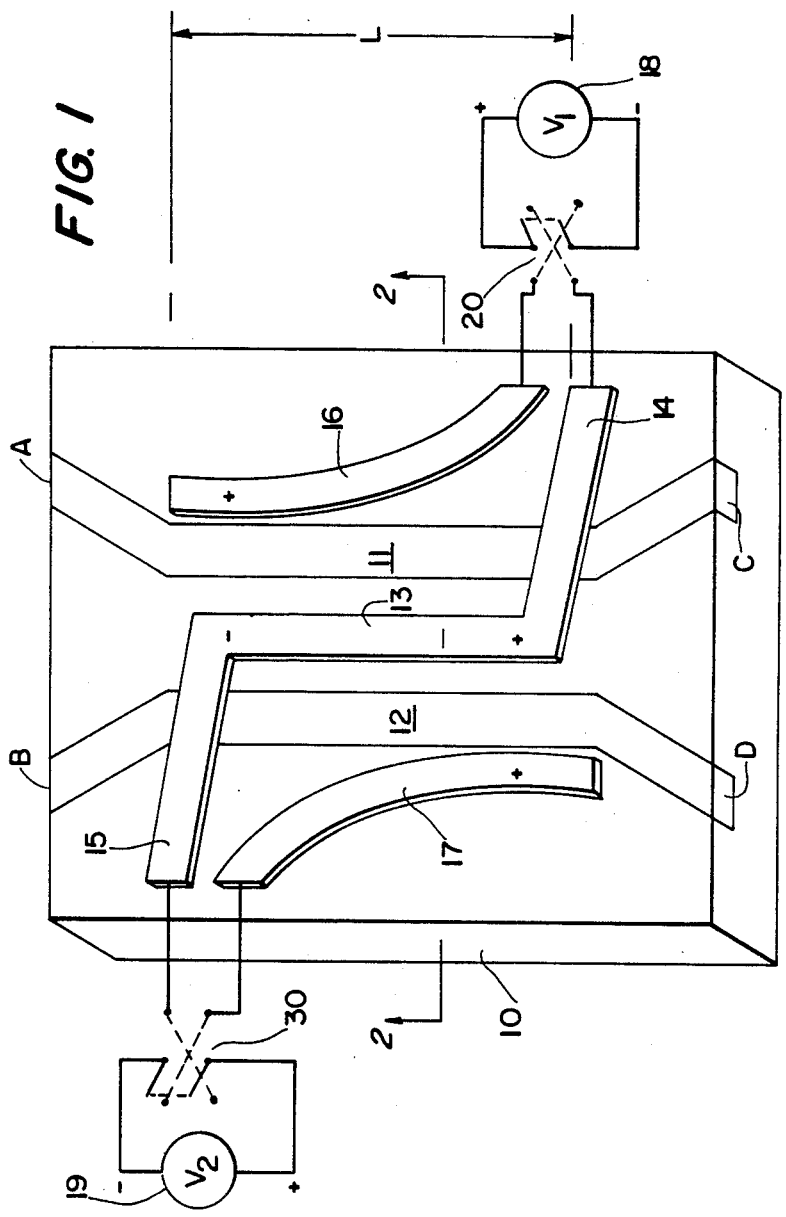
FIG. 1 is a perspective view of the waveguide switching device.

This device includes a substrate 10 of electro-optic material such as LiNbO$_3$ within which a pair of spaced waveguides 11 and 12 of an electro-optic material having an index of refraction higher than the substrate is formed. The waveguides have a rectangular cross section and are embedded in the substrate 10 such that their upper surfaces are coplanar with the substrate surface and each other. The major lengths of the waveguides are parallel with each other with their ends diverging from each other. The separation between the ends of the waveguides causes them to act as power dividers. An electrode 13 is laid down on the surface of the substrate centrally between the pair of waveguides paralleling a major portion of the waveguides. One end 14 of the electrode 13 goes off at an angle crossing over the waveguide 11 and the opposite end 15 is at an angle crossing over the waveguide 12. An insulator may be placed between the electrodes and the waveguide at their crossover.

A pair of curved electrodes 16 and 17 are disposed on the surface of the substrate with one electrode on the outside of each waveguide. Electrodes 16 and 17 curve uniformly away from the waveguides with the end of each electrode closest to the adjacent waveguide being opposite the end of the central electrode which is directed off at an angle in a direction away from the end of the curved electrode closest to the waveguide. The curved electrodes are related to each other such that the spacing separating them is equal, at equal distances on opposite sides of a center line perpendicular to the length of the waveguides. Curved electrode 16 and the angular end 14 of central electrode 13 are connected electrically to a double-pole, double-throw, polarity reversing switch 20 connected electrically to a voltage source 18. Curved electrode 17 and the angular end 15 of the central electrode 13 are connected electrically to a double-pole, double-throw, polarity reversing switch 30 which is connected electrically to a voltage source 19. The double-pole, double-throw switches and the voltage sources are connected such that in the "on" state opposite polarity is applied to the curved electrodes 16, 17, while in the "off" state the same polarity is applied to the curved electrodes. In the "on" state, switching takes place, while in the "off" state the radiation passes straight through without any switching.

Figure 2:
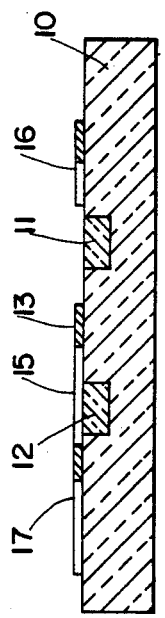
FIG. 2 is a cross-sectional view illustrating the relative parts.

FIG. 2 is a cross-sectional view of the device taken across its center which illustrates the relationship of the various parts.

Figure 3:
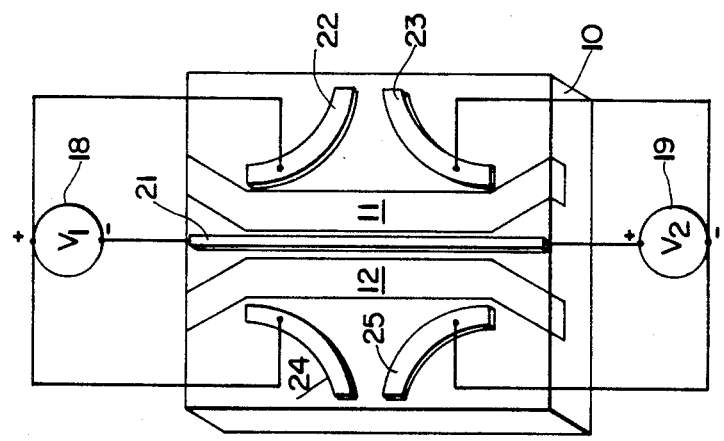
FIG. 3 is a modification of the device shown in FIG. 1.

FIG. 3 is a modification of the device shown in FIGS. 1 and 2. The device includes a substrate 10 of an electro-optic material, such as LiNbO$_3$ with waveguides 11 and 12 such as described above for FIG. 1. An elongated electrode 21 is deposited on the surface of the substrate directly between waveguides 11 and 12. The electrode 21 extends beyond the parallel sections of the waveguides and is connected at one end electrically to the negative side of voltage source 18 and at the opposite end to the positive side of voltage source 19. A pair of curved electrodes 22 and 23 are deposited opposite the outer side of waveguide 11 and a pair of curved electrodes 24 and 25 are deposited opposite the outer side of waveguide 12. Each pair of electrodes are deposited such that the end toward the outer ends of the waveguides are closest to the surface of the adjacent waveguide with the electrodes directed toward each other and curved away from the waveguide, with the ends of the electrodes approaching a center line perpendicular to the waveguides. Thus, the corresponding parts of the curved electrodes of each pair are equidistant from the center line. Electrodes 22 and 24 are opposite the same end of the waveguides and are shown connected electrically to the positive side of voltage source 18. Likewise electrodes 23 and 25 are opposite the other end of the waveguides and are connected electrically to the negative side of voltage source 19.

With the switching arrangement shown in the drawings and described above, with the switch in the "on" state the waveguide device behaves as a tapered velocity coupler. In the "on" state the voltage is applied so that the difference in propagation constant, $\Delta\beta$ between the interacting channel varies slowly over the length of the device changing polarity sign in the middle of the structure. In the "on" state $V_1 = +V_2$. If the voltage is adjusted such that $\int_0^L \sqrt{\Delta\beta^2 + 4|K|^2}\, dz = m\pi$ where m is an odd integer, K is the coupling constant between the two guides, and the rate of change of $\Delta\beta$ with propagation direction is held low enough to ensure adiabatic propagation within the center of the device, then power will be transfered from one guide to the next. In the "off" state, $V_1 = -V_2$ where the voltage is applied such than $\Delta\beta$ has the same sign over the length (L) of the device. If the voltage is such that $\int_0^L \sqrt{\Delta\beta^2 + 4|K|^2}\, dz = n\pi$ where n is an even integer then no power will transfer between the two channels. L is the length of the main body of the optical waveguides between the angular spreading ends. The most efficient length is $L = 2\pi/\sqrt{|K|^2}$.

In the arrangement shown in FIG. 3, $\Delta\beta = 0$ in the center of the device in both the "off" and "on" state. The device may be constructed without the center electrode 21 if the proper orientation of the electro-optic crystal is chosen.

In operation of the device of FIG. 1, the double pole-double throw switches are closed so that electrode 16 is more positive then electrode 13, electrode 13 is more positive than electrode 1 which occurs when $V_1 = +V_2$. In this position, with the proper magnitude of $V_1$ radiation entering waveguide 11 at A will be switched out on waveguide 12 at D. Radiation entering waveguide 12 at B will be switched to waveguide 11 and out at C. With the switches in the same position, radiation entering at C will be switched out on B and radiation entering D will be swtiched out on A. Changing the polarity of the electrodes by changing the position of one of the switches such that $V_1 = -V_2$ then with the proper magnitude of $v_1$ the radiation entering A will leave at C, and if it enters B it will leave at D. Also if radiation enters C, it will leave on A, and if it enters D, it will leave on B. Thus, it can be seen that if $V_1 = +V_2$ radiation will be switched from one waveguide to the other and if $V_1 = -V_2$, the radiation will pass straight through in the waveguide in which it enters.

The modification shown in FIG. 3 will switch radiation the same as described above if $V_1 = +V_2$, with the proper magnitude of $V_1$.

With a waveguide-electrode structure as described above, the waveguides may be made without a critical length. Errors in length may be compensated for by changing the voltage. With a waveguide structure with a length of $L = 2\pi/\sqrt{|K|^2}$, the voltages $V_1$ and $V_2$ may be 10 volts.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A four part electro-optical switch for selectively switiching radiation from one light path to another comprising:

a substrate of an electro-optic material;
   a first optical waveguide;
   a second optical waveguide;
   said waveguides being spaced from each other and paralleling each other along the major portion of their length with the ends of said waveguides diverging from each other;
   at least one pair of curved electrodes with one electrode disposed on said substrate along the outer surface of each of said waveguides with one end adjacent a divergent end with the opposite end of each of said electrodes curved away from its adjacent waveguide;
   an electrode disposed on said substrate equidistant between said waveguides, said electrode including a first and second end;
   means for connecting a first voltage source to said first end of said third electrode and to the end of one of said curved electrodes which end is curved away from said waveguide, adjacent to said curved electrode;
   means for connecting a second voltage source to the second end of said third electrode and to the end of the other electrode of said pair of electrodes which end is curved away from is adjacent waveguide,
   whereby in the "on " state the voltage of said first and second sources is applied so that the difference in propagation constant between said waveguide channels varies slowly over their length changing sign in the mid-point of their length thereby switching optical radiation from one waveguide to the other.

2. A four part electro-optical switch for selectively switching radiation from one light path to another as claimed in claim 1 wherein:
   said switch includes one pair of curved electrodes disposed relative to said waveguides.

3. A four part electro-optical switch as claimed in claim 1 wherein:
   said switch includes two pairs of curved electrodes disposed relative to said waveguides.

* * * * *